United States Patent
Jin (10) Patent No.: US 9,607,222 B2
(45) Date of Patent: Mar. 28, 2017

(54) METHOD AND APPARATUS FOR IMPLEMENTING AUGMENTED REALITY

(71) Applicant: HUAWEI DEVICE CO., LTD., Shenzhen (CN)

(72) Inventor: Zhihao Jin, Beijing (CN)

(73) Assignee: HUAWEI DEVICE CO., LTD., Shenzhen (CN)

( * ) Notice: Subject to any disclaimer, the term of this patent is extended or adjusted under 35 U.S.C. 154(b) by 94 days.

(21) Appl. No.: 14/584,241

(22) Filed: Dec. 29, 2014

(65) Prior Publication Data
US 2015/0109339 A1    Apr. 23, 2015

Related U.S. Application Data

(63) Continuation of application No. PCT/CN2013/079507, filed on Jul. 17, 2013.

(30) Foreign Application Priority Data

Jul. 19, 2012 (CN) .......................... 2012 1 0251097

(51) Int. Cl.
*G06K 9/00* (2006.01)

(52) U.S. Cl.
CPC ................ *G06K 9/00671* (2013.01)

(58) Field of Classification Search
CPC .. G06F 3/0481; G06F 3/04817; G06F 9/4443; G06F 3/04847; G06F 11/3664;
(Continued)

(56) References Cited

U.S. PATENT DOCUMENTS

| 2004/0113050 A1* | 6/2004 | Olszak | G02B 21/002 250/208.1 |
|---|---|---|---|
| 2007/0162846 A1* | 7/2007 | Cave | G06F 17/3089 715/210 |

(Continued)

FOREIGN PATENT DOCUMENTS

| CN | 102054166 | 5/2011 |
|---|---|---|
| CN | 102238466 | 11/2011 |

(Continued)

OTHER PUBLICATIONS

Chinese Office Action dated Feb. 29, 2016 in corresponding Chinese Patent Application No. 201210251097.4.
(Continued)

*Primary Examiner* — Todd Buttram
(74) *Attorney, Agent, or Firm* — Staas & Halsey LLP (57) ABSTRACT

A method and an apparatus for implementing augmented reality are provided, where the method includes: acquiring real image information by using a camera; acquiring one or more target objects selected by a user from the real image information; with respect to each target object, acquiring an identification image that is used to identify the target object and categorization information of the target object separately; acquiring an image template corresponding to the categorization information, and performing image matching of the image template with the identification image to identify each target object; and acquiring augmented information corresponding to each identified target object, and simultaneously displaying the identification image of the target object and the augmented information to form the augmented reality. The present invention reduces limitation on using the augmented reality, so that it is more convenient for the user to use the augmented reality.

16 Claims, 6 Drawing Sheets

(58) Field of Classification Search
CPC ........ G06F 3/011; G06F 3/012; G06F 3/0304;
G06T 19/00; G06T 17/00; G06T 19/006;
H04N 5/272; A63F 13/10
See application file for complete search history.

(56) References Cited

U.S. PATENT DOCUMENTS

| | | | |
|---|---|---|---|
| 2008/0265143 A1* | 10/2008 | Peters | G06F 3/0304 250/221 |
| 2009/0208116 A1* | 8/2009 | Gokturk | G06F 17/30259 382/209 |
| 2010/0260426 A1 | 10/2010 | Huang et al. | |
| 2011/0102605 A1 | 5/2011 | Hannaford | |
| 2011/0138317 A1 | 6/2011 | Kang et al. | |
| 2011/0221769 A1 | 9/2011 | Leung et al. | |
| 2011/0254861 A1 | 10/2011 | Emura et al. | |
| 2012/0044263 A1 | 2/2012 | Kim et al. | |
| 2012/0098859 A1 | 4/2012 | Lee et al. | |
| 2012/0135784 A1 | 5/2012 | Lee et al. | |
| 2013/0034295 A1* | 2/2013 | Tsuchinaga | G06K 9/6857 382/153 |
| 2013/0101157 A1* | 4/2013 | Li | G06K 9/00805 382/103 |
| 2013/0335573 A1* | 12/2013 | Forutanpour | G06F 3/011 348/158 |

FOREIGN PATENT DOCUMENTS

| | | |
|---|---|---|
| CN | 102402790 | 4/2012 |
| CN | 102479251 | 5/2012 |
| CN | 102566893 | 7/2012 |
| EP | 2 418 563 A2 | 2/2012 |
| JP | 2012-123548 | 6/2012 |

OTHER PUBLICATIONS

Extended European Search Report dated Aug. 18, 2015 in corresponding European Patent Application No. 13819639.9.
Bruns et al., "Mobile Phone-Enabled Museum Guidance with Adaptive Classification", Projects in VR, Jul./Aug. 2008, pp. 98-102.
PCT International Search Report dated Oct. 24, 2013 in corresponding International Patent Application No. PCT/CN2013/079507.
International Search Report mailed Oct. 24, 2013 in corresponding International Patent Application No. PCT/CN2013/079507 (2 pages) (2 pages English Translation).

\* cited by examiner

METHOD AND APPARATUS FOR IMPLEMENTING AUGMENTED REALITY

CROSS-REFERENCE TO RELATED APPLICATIONS

This application is a continuation of International Application No. PCT/CN2013/079507, filed on Jul. 17, 2013, which claims priority to Chinese Patent Application No. 201210251097.4, filed on Jul. 19, 2012, both of which are hereby incorporated by reference in their entireties.

TECHNICAL FIELD

The present invention relates to communications technologies, and in particular, to a method and an apparatus for implementing augmented reality.

BACKGROUND

Augmented reality (Augmented Reality, AR for short) is an emerging computer application and man-machine interaction technology developed based on virtual reality technologies. Using an object in the real world as a target object, the AR obtains augmented information related to the target object upon recognizing the target object, where the augmented information is, for example, advertisement information, distance information, or one or more other virtual object related to the target object; and then superimposes the target object and the augmented information in a same image by using computer and virtualization technologies, thereby implementing augmented reality.

A method for implementing augmented reality adopted in the prior art is as follows: a user first needs to determine a target object in the real world the user wants to shoot and identify, for example, the user first determines that he or she wants to shoot a specific architecture; then the user selects a category of the target object, focuses on and shoots the target object in the real world, and performs image matching of an obtained picture with a plurality of prestored image templates belonging to the foregoing selected category to identify which image template matches with the target object in the picture, so that identification of the target object is complete; and subsequently the user obtains augmented information corresponding to the identified target object. However, a disadvantage of this manner is that a to-be-shot target object needs to be determined and a category of the target object needs to be selected, before a user shoots the target object. If the user determines to identify the target object after shooting randomly, subsequent operations, such as identification and matching, cannot be executed because the category is not preselected. Therefore, the user's usage may be significantly limited, thereby resulting in a poor user experience, which may be referred to as a serious limitation on use of the augmented reality.

SUMMARY

The present invention provides a method and an apparatus for implementing augmented reality, to reduce limitation on using the augmented reality, so that it is more convenient for a user to use the augmented reality.

According to a first aspect, the present invention provides a method for implementing augmented reality, and the method includes:

acquiring real image information by using a camera;

acquiring one or more target objects selected by a user from the real image information;

with respect to each target object, acquiring an identification image that is used to identify the target object, and categorization information of the target object separately;

acquiring an image template corresponding to the categorization information, and performing image matching of the image template with the identification image to identify each target object; and acquiring augmented information corresponding to each identified target object separately, and simultaneously displaying the identification image and the augmented information of the target object to form the augmented reality.

In a possible implementation manner, the acquiring a plurality of target objects selected by a user from the real image information includes: performing preliminary identification of the real image information to obtain a preliminary target object image, where definition of the preliminary target object image is lower than definition of the identification image of the target object; and acquiring the plurality of target objects selected by the user from the preliminary target object image.

In another possible implementation manner, the acquiring categorization information of the target object includes: acquiring preliminary categorization information of the target object; and acquiring the categorization information obtained upon correcting the preliminary categorization information.

In still another possible implementation manner, when the preliminary target object image is obtained by performing preliminary identification of the real image information and the plurality of target objects are obtained by selecting from the preliminary target object image, the acquiring categorization information of the target object includes: sending the preliminary target object image to a network server, and receiving the preliminary categorization information that is returned by the network server and is corresponding to the preliminary target object image; or, locally determining preliminary categorization information that is corresponding to the preliminary target object image.

In yet another possible implementation manner, the acquiring the categorization information obtained upon correcting the preliminary categorization information includes: presenting the preliminary categorization information to a user, and receiving the categorization information obtained correcting the preliminary categorization information by the user; or, acquiring the categorization information by locally correcting the preliminary categorization information.

In still yet another possible implementation manner, if the camera is a camera of an ordinary camera, the acquiring an identification image that is used to identify the target object includes acquiring the identification image by focusing on and shooting the target object by using the ordinary camera; and if the camera is a camera of a light field camera, the acquiring an identification image that is used to identify the target object includes generating the identification image by focusing on the target object in the real image information.

According to another aspect, the present invention provides a method for implementing augmented reality, and the method includes:

sending, to a terminal, an image template corresponding to categorization information that is sent by the terminal, so that the terminal identifies the target object by performing image matching according to the image template and an identification image of a target object corresponding to the categorization information; the target object is one or more target objects selected by a user from real image information obtained from the terminal by using a camera, and the categorization information is categorization information of each target object; and sending, to the terminal, augmented information corresponding to each target object that is identified by the terminal, so that the terminal simultaneously displays the augmented information and the identification image of the target object to form the augmented reality.

In a possible implementation manner, before the sending, to a terminal, an image template corresponding to categorization information that is sent by the terminal, the method further includes: receiving a preliminary target object image sent by the terminal, where the preliminary target object image is obtained by performing, by the terminal, preliminary identification of the real image information, and the target object is obtained by selecting from the preliminary target object image; and definition of the preliminary target object image is lower than definition of the identification image of the target object; and sending, to the terminal, preliminary categorization information corresponding to the preliminary target object image, so that the terminal obtains the categorization information obtained upon correcting the preliminary categorization information.

According to another aspect, the present invention provides a terminal, and the terminal includes:

a camera, configured to obtain real image information;

an augmented reality client, configured to: obtain the real image information obtained by the camera, obtain one or more target objects selected by a user from the real image information; and with respect to each target object, obtain an identification image that is used to identify the target object and categorization information of the object separately; obtain an image template corresponding to the categorization information from a network server; and obtain augmented information corresponding to each identified target object from the network server separately, and simultaneously display the identification image of the target object and the augmented information to form augmented reality; and an image identification unit, configured to match the image template obtained by the augmented reality client with the identification image to identify each target object.

In a possible implementation manner, the image identification unit is further configured to receive the real image information sent by the augmented reality client, and perform preliminary identification of the real image information to obtain a preliminary target object image, where definition of the preliminary target object image is lower than definition of the identification image of the target object; and return the preliminary target object image to the augmented reality client; the augmented reality client is further configured to present the preliminary target object image identified by the image identification unit to the user, and obtain a plurality of target objects selected by the user from the preliminary target object image.

In another possible implementation manner, the augmented reality client is further configured to obtain preliminary categorization information of the target object and the categorization information obtained by correcting the preliminary categorization information.

In another possible implementation manner, the augmented reality client is specifically configured to: send the preliminary target object image to the network server, and receive preliminary categorization information that is returned by the network server and is corresponding to the preliminary target object image; or locally determine preliminary categorization information corresponding to the preliminary target object image.

In another possible implementation manner, the augmented reality client is specifically configured to present the preliminary categorization information to the user and receive the categorization information obtained by the user upon correcting the preliminary categorization information; or, obtain the categorization information upon locally correcting the preliminary categorization information.

In still another possible implementation manner, if the camera is a camera of an ordinary camera, the augmented reality client is further configured to obtain the identification image obtained by focusing on and shooting the target object by using the camera; and if the camera is a camera of a light field camera, the augmented reality client is further configured to generate the identification image by focusing on the target object in the real image information.

According to another aspect, the present invention provides a network server, and the network server includes:

an image template management unit, configured to send, to a terminal, an image template corresponding to categorization information that is sent by the terminal, so that the terminal identifies the target object by performing image matching according to the image template and an identification image of the target object corresponding to the categorization information; where the target object is one or more target objects selected by a user from a real image information obtained from the terminal by using a camera, and the categorization information is categorization information of each target object;

an augmented information management unit, configured to send, to the terminal, augmented information that is corresponding to each target object and is identified by the terminal, so that the terminal simultaneously displays the augmented information and the identification image of the target object to form augmented reality.

In a possible implementation manner, an image categorization unit is configured to receive a preliminary target object image sent by the terminal, where the preliminary target object image is obtained by performing, by the terminal, preliminary identification of the real image information, and the target object is obtained by selecting from the preliminary target object image; and definition of the preliminary target object image is lower than definition of the identification image of the target object; and send, to the terminal, preliminary categorization information corresponding to the preliminary target object image, so that the terminal obtains the categorization information obtained upon correcting the preliminary categorization information.

According to a method and an apparatus for implementing augmented reality provided in the present invention, the technical effects are: by acquiring real image information first and then selecting, by a user, a target object from the real image information, the user may process augmented reality after randomly shooting instead of determining the target object and a category of the object at first, to reduce a limitation on using the augmented reality, so that it is more convenient for the user to use the augmented reality.

DESCRIPTION OF EMBODIMENTS

Figure 1:
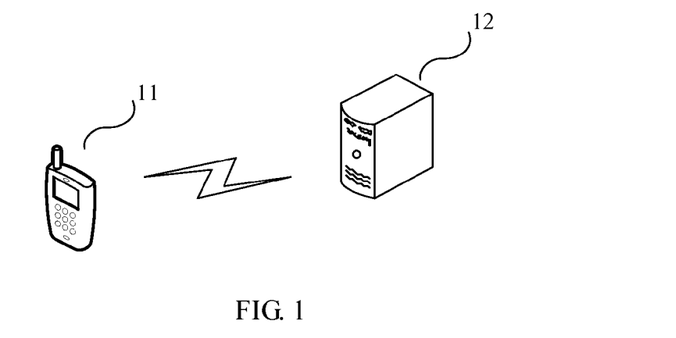
FIG. 1 is a diagram of a system architecture applied in a method for implementing augmented reality according to an embodiment of the present invention.

A system architecture applied to a method for implementing augmented reality according to an embodiment of the present invention is provided. Referring to FIG. 1, FIG. 1 is a system architecture applied to a method for implementing augmented reality according to an embodiment of the present invention. Generally, the augmented reality is implemented between a terminal 11 and a network server 12 by means of communication. A plurality of image templates and augmented information are stored on the network server 12, and the terminal 11 may perform image matching of an image obtained by shooting on its own with the image template obtained from the network server 12 to identify a target object in the captured image, to obtain augmented information of the target object from the network server 12. The augmented information is superimposed on the target object and displayed at the same time to implement the augmented reality.

The following describes the method for implementing augmented reality according to embodiments of the present invention in detail.

Embodiment 1

Figure 2:
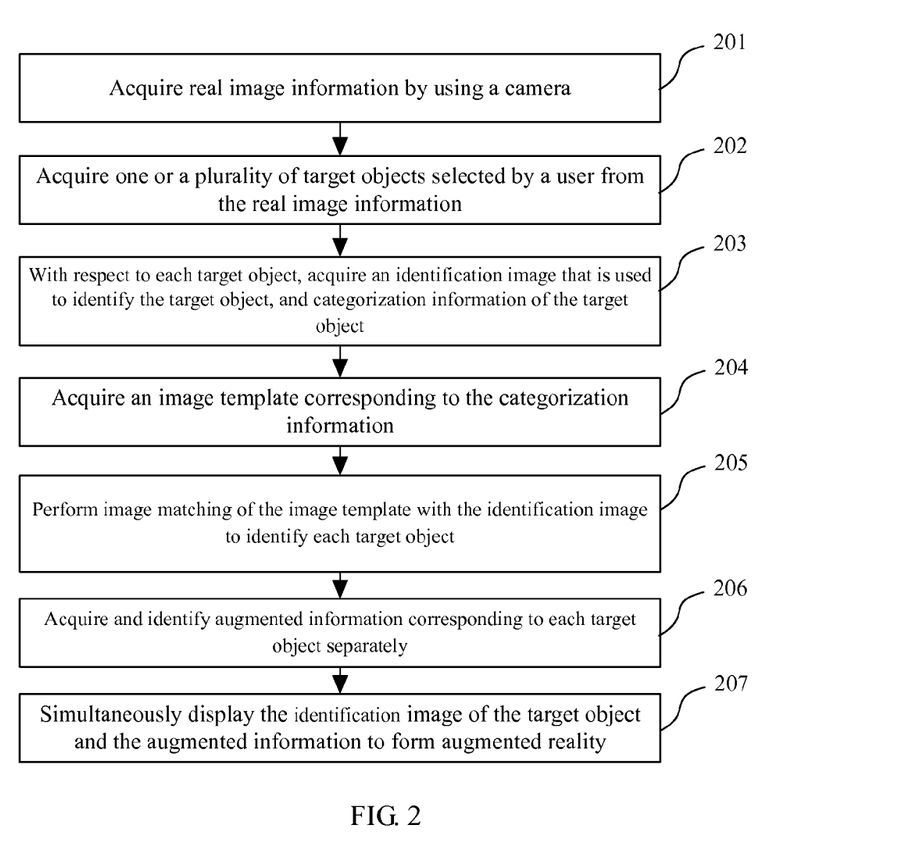
FIG. 2 is a schematic flowchart of a method for implementing augmented reality according to an embodiment of the present invention.

FIG. 2 is a schematic flowchart of a method for implementing augmented reality according to an embodiment of the present invention. As shown in FIG. 2, the method provided in the embodiment is executed by the terminal, where the method may include:

201. Obtain real image information by using a camera.

The terminal may obtain the real image information by using a camera of the terminal, where the real image information may be, for example, a picture of a current scenario shot randomly by using the camera, that is, a picture of the real world; or a video frame of the real world obtained by using the camera.

202. Obtain one or more target objects selected by a user from the real image information.

In this embodiment, the terminal may present the real image information to the user, and the user selects the target object from the real image information. In addition, in this embodiment, the user may select the one or more target objects, so that the terminal may know all at once that the user wants to obtain the one or more target objects of the augmented information, where the target object refers to an object of which the user wants to obtain the augmented information.

For example, many objects, such as a tower, a figure, and a tree, are included in a picture (the real image information) shot by using the camera, and if the user selects the tower and the tree (for example, selection may be made by circling the tower and the tree, or in another manner, which is not limited in the present invention), it indicates that the user wants to obtain the augmented information of the tower and the tree. Therefore, the tower and the tree are called the target objects.

203. With respect to each target object, obtain an identification image that is used to identify the target object, and categorization information of the target object.

After the target object is selected by the user, to execute a subsequent step of acquiring the augmented information of the target object, the identification image of and the categorization information of the target object need to be obtained. This is because: a plurality of image templates and augmented information corresponding to the image templates are stored on a network server side, and the terminal needs to identify an image template that matches the target object during a process of performing the image matching of an image of the target object with the plurality of image templates, to obtain the corresponding augmented information. For example, the network server side stores a template A (that is, a template of an object A), a template B (that is, a template of an object B), and a template C (that is, a template of an object C) and stores augmented information corresponding to each template. It is assumed that after performing image matching of the image shot by the terminal with the foregoing several templates, the image is found to be matched with the template B, which indicates that the image is an image of the object B, that is, the image is identified. And further, augmented information of the object B is augmented information corresponding to the template B (in fact, it is the augmented information of the object B).

To perform the foregoing image identification process, the identification image used to identify the target object needs to be obtained. The identification image is a focused image of the target object, because generally, definition of a picture taken by using the camera is relatively low. To perform exact image identification, an image with high definition must be used, where the image with high definition is called an identification image, that usually is, an image that is obtained by focusing on and shooting the target object. In addition, on the network server side, the plurality of templates is stored by categorization, such as a plant template and a building template. Therefore, the categorization information of the target object, for example, the target object belongs to a figure or a plant, is usually obtained before acquiring a template from the network server, so that many corresponding image templates that are returned by the network server to the terminal according to the categorization information are used for identification of the target object.

204. Obtain an image template corresponding to the categorization information.

For example, after acquiring the categorization information of the target object, the terminal requests the image template from the network server and carries the categorization information. The network server may send a plurality of image templates corresponding to the categorization information to the terminal according to the categorization information. For example, if the categorization information sent by the terminal to the network server belongs to the plant template, the network server may return a plurality of image templates corresponding to the plant template to the terminal.

205. Perform image matching of the image template with the identification image to identify each target object.

After receiving the image template, the terminal may perform image matching of the image template with the identification image of the target object, that is, an identification process of the target object. As described above, assuming that an image taken by the terminal matches with the template B, it indicates that it is identified that the image taken by the terminal is the image of the template B; that is, in the image identification, if an image can be matched with an image template, the image is identified, where the matching may refer to that, for example, a size, a shape, and a direction of the image are consistent.

206. Obtain and identify augmented information corresponding to each target object separately.

For example, upon identifying the target object, the terminal requests the augmented information corresponding to the target object from the network server. As described above, the network server side stores each template and the augmented information corresponding to each template separately. After the terminal identifies that the image it shot matches with the image template, the terminal can inform the network server of an identity of the matched image template. For example, as described above, the terminal informs the network server of an identity of the template B (that is, the target object is the object B represented by the template B), then the network server may send the augmented information corresponding to the template B to the terminal. The augmented information is, for example, various types of information related to the object B, such as a distance and an advertisement.

207. Simultaneously display the identification image of the target object and the augmented information to form the augmented reality.

The terminal simultaneously displays the received augmented information and the identification image of the target object to form the augmented reality. For example, the terminal displays the target object "tower" and the augmented information "a height of . . . is" of the tower to implement the augmented reality, that is, augmentation of the actual object "the tower" in the real world because other relevant information of the object is added.

It should be noted that in subsequent embodiments of the present invention, that a terminal obtains an image template from a network server to implement image matching is used as an example for description. In specific implementation, part or all of such steps as acquiring of the image template, image matching, and acquiring of augmented information may be executed by the network server. For example, after the terminal obtains an identification image and categorization information of the identification image, the terminal may transfer the identification image and the categorization information of the identification image to the network server; the network server obtains the image template of a target object and performs the image matching according to the categorization information, then obtain the corresponding augmented information according to the image template obtained by means of matching; finally the network server transfers the augmented information to the terminal.

According to a method for implementing augmented reality provided in this embodiment, a user may first take a photo of real image information, then selects one or more target objects all at once from the real image information shot by a terminal. In addition, the terminal may obtain augmented information corresponding to each target object separately. Therefore, the user may take photos randomly without determining the target object and an object category at first, and then process the augmented reality, to reduce limitation on using the augmented reality, so that it is more convenient for the user to use the augmented reality. In addition, when the user identifies a plurality of target objects, in the prior art, a same processing can only be performed on the plurality of target objects separately, such as selecting a category of the object, then taking a photo and performing the image matching, which causes a low efficiency. However, according to a manner of processing the target objects one by one in this embodiment, the terminal may obtain the user's selection of the plurality of target objects more quickly, and obtain augmented information of the plurality of target objects more quickly, so as to significantly improve an implementation efficiency of the augmented reality.

Embodiment 2

Figure 3:
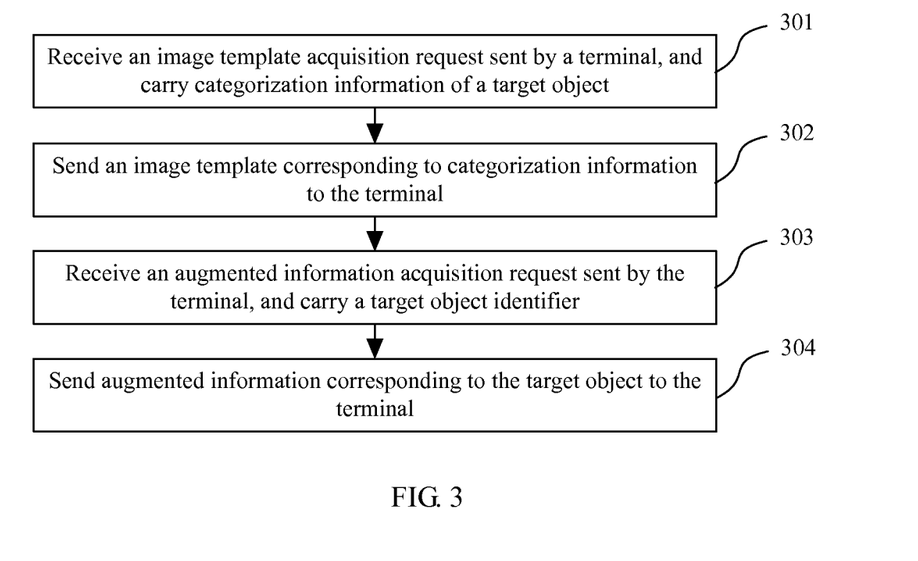
FIG. 3 is a schematic flowchart of a method for implementing augmented reality according to another embodiment of the present invention.

FIG. 3 is a schematic flowchart of a method for implementing augmented reality according to another embodiment of the present invention, where the method provided in this embodiment is executed by a network server. As shown in FIG. 3, the method may include:

301. Receive an image template acquisition request sent by a terminal, and carry categorization information of a target object.

After the terminal obtains a target object selected by a user and obtains categorization information of the target object, the terminal sends the image template acquisition request to the network server, carries the categorization information of the target object, and requests acquiring of an image template corresponding to the categorization information.

302. Send an image template corresponding to categorization information that is sent by the terminal to the terminal.

The network server sends the image template corresponding to the categorization information to the terminal, so that the terminal performs the image matching of the image template with an identification image of the target object to identify the target object.

303. Receive an augmented information acquisition request sent by the terminal, and carry a target object identifier.

After the terminal identifies the target object, the terminal may send the augmented information acquisition request to the network server, and request acquiring of the augmented information corresponding to the target object; and the terminal carries the target object identifier, so that the network server searches for corresponding augmented information according to the target object identifier. The target object identifier may be, for example, an identity of an image template matched with an identification image of the target object. As described above, assuming that the identification image of the target object that is shot by the terminal matches with a template B, it indicates that the target object is an object represented by the template B. An identity of the template B is used as the target object identifier and is sent to the network server, then the network server may obtain the augmented information corresponding to the template B, and the information is also the augmented information of the target object.

304. Send augmented information corresponding to the target object to the terminal.

In this embodiment, a network server may send augmented information corresponding to each target object that is identified by a terminal to the terminal, so that the terminal displays the augmented information and an identification image of the target object to form augmented reality.

Embodiment 3

Figure 4A:
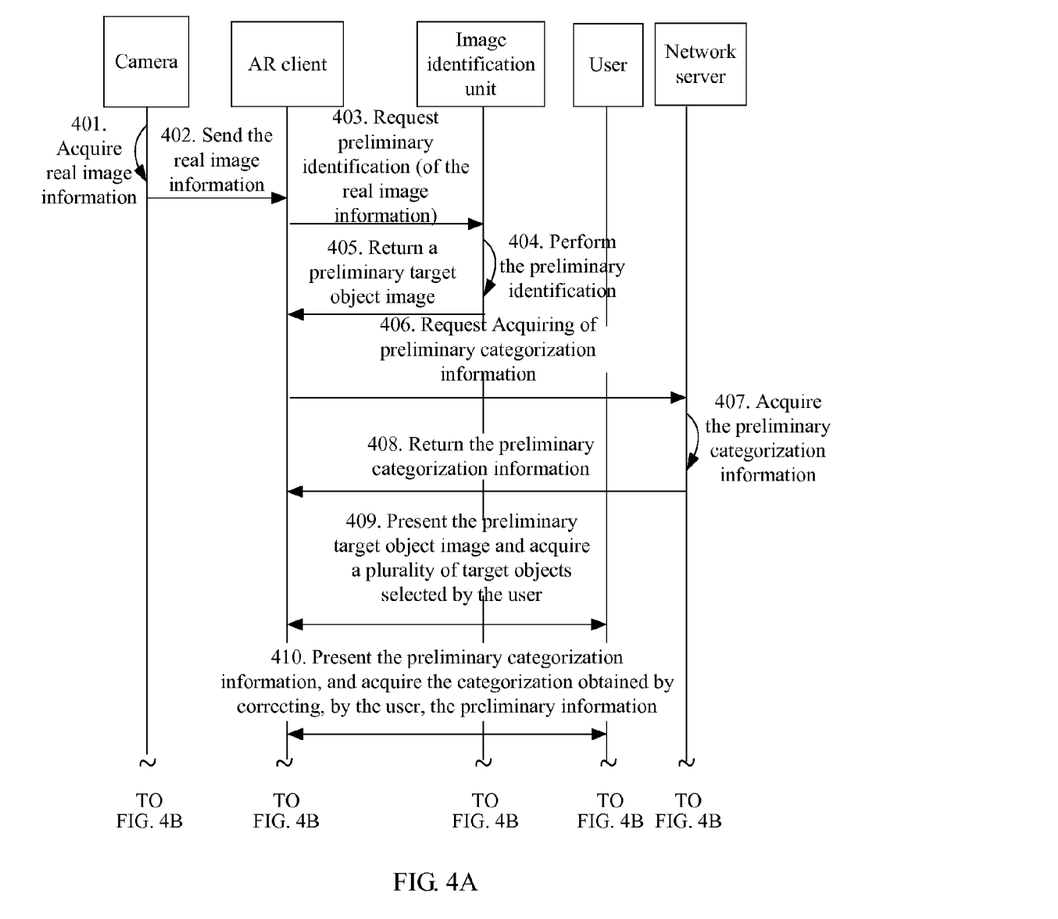
FIG. 4A and FIG. 4B are a schematic signaling diagram of a method for implementing augmented reality according to another embodiment of the present invention.
Figure 4B:
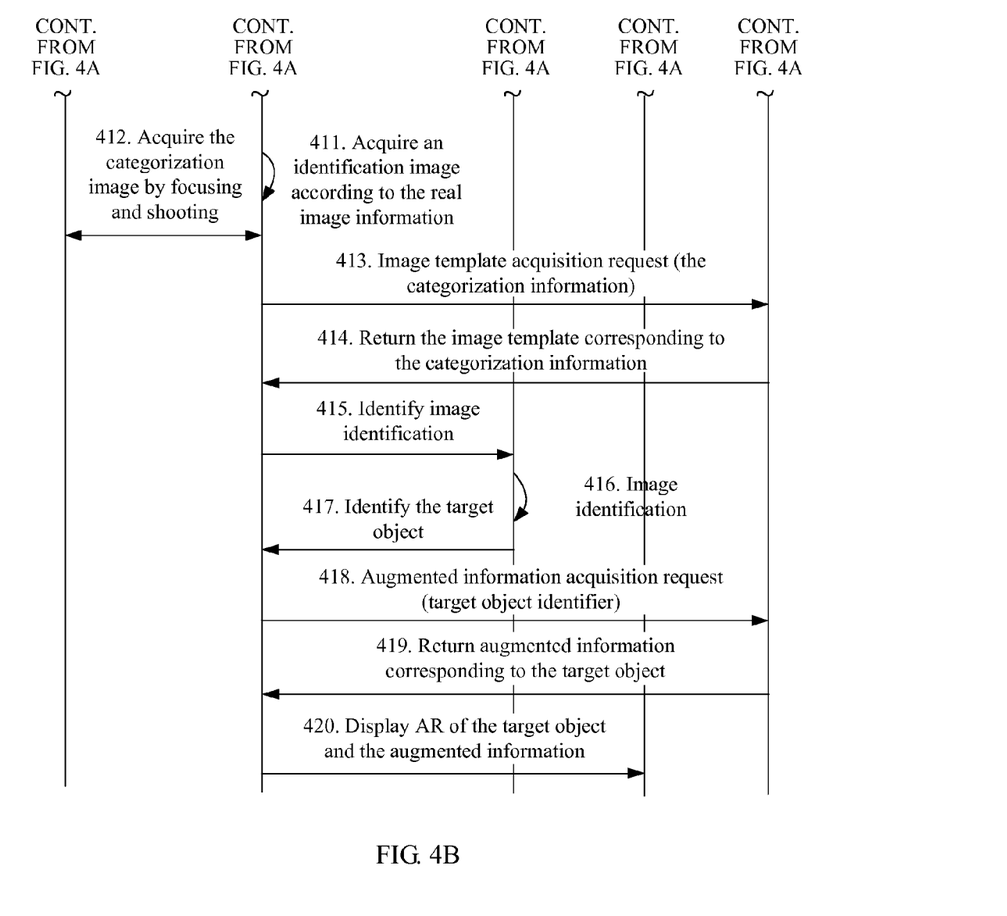

FIG. 4A and FIG. 4B are a schematic signaling diagram of a method for implementing augmented reality according to still another embodiment of the present invention. This embodiment is executed by a terminal and a network server together, so as to describe the method for implementing augmented reality more specifically. To make description of the method clearer, a camera, an augmented reality AR client, and an image identification unit included in the terminal are shown in the signaling diagram, and the method is described based on this three units. In specific implementation, the image identification unit and the AR client may be integrated into a functional module. For example, the image identification unit is integrated into the AR client.

As shown in FIG. 4, the method may include:

401. A camera obtains real image information.

The terminal may obtain the real image information by using the camera, where the real image information may be a picture or a video frame of the real world; and the camera may be a camera of a light field camera or an ordinary camera.

402. The camera sends the real image information to an AR client.

403. The AR client sends the real image information to an image identification unit to request performing of preliminary identification.

An AR client on the terminal sends the real image information obtained by the camera to the image identification unit to request the image identification unit to perform preliminary identification on the real image information.

404. The image identification unit performs the preliminary identification on the real image information to obtain a preliminary target object image.

The image identification unit mainly uses a computer vision technology to obtain an object outline in the real image information, and obtain spatial information of an object according to the object outline and pixel brightness information in an image; that is, this step is equivalent to preliminarily identifying an individuality of the object included in the real image information. However, definition of the image of the individuality is not high enough to perform subsequent image identification, because the definition of the image of the individuality is lower than definition of an identification image of the target object. The object preliminarily identified in this step is not the target object that is finally selected by a user, and of which the user expects to obtain augmented information. Therefore, the object is called a preliminary target object.

Figure 5:
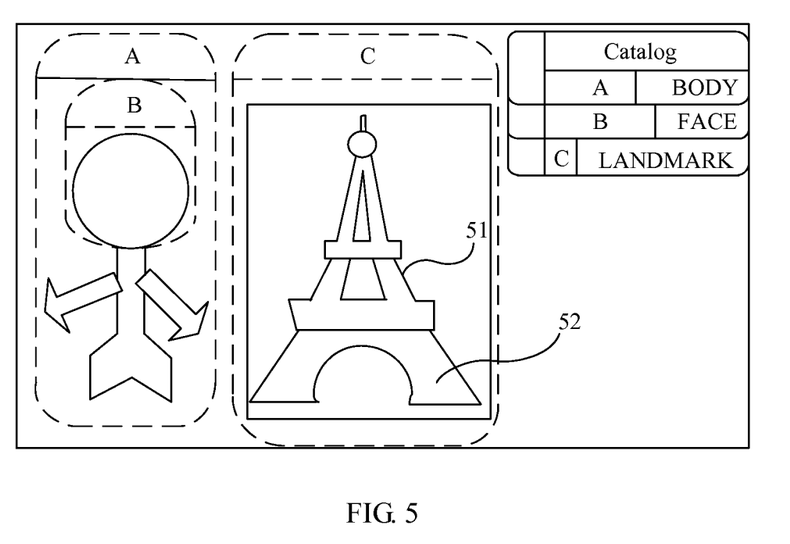
FIG. 5 is a schematic diagram of image presentation of a method for implementing augmented reality according to still another embodiment of the present invention.

For example, assuming that the terminal obtains a picture of a current scenario by using the camera, the picture is the real image information. The picture includes various objects, such as a figure and a tower, and in this step, the preliminary identification is performed on the objects in the picture to obtain general outlines of such objects as the figure and the tower; that is, distinguishing each object in the picture. Reference may be made to FIG. 5. FIG. 5 is a schematic diagram of image presentation of a method for implementing augmented reality according to still another embodiment of the present invention. In FIG. 5, A, B and C are three preliminary target objects obtained by performing the preliminary identification by the terminal, where A is a body (BODY), B is a face (FACE), and C is a tower. It can be seen that a general individuality of the object rather than a clear image is obtained after performing the preliminary identification. For example, the individuality of the tower includes an outline 51 of the tower, and an entity 52 that is determined according to the pixel brightness information and is surrounded by the outline 51 of the tower.

405. The image identification unit sends the preliminary target object image to the AR client.

406. The AR client sends the preliminary target object image to the network server to request acquiring of preliminary categorization information.

The AR client sends the preliminary target object that is identified by the image identification unit to the network server, so as to request the network server to obtain the preliminary categorization information of the preliminary target object image, where the preliminary categorization information refers to categorization information corresponding to the preliminary target object image.

407. The network server obtains preliminary categorization information of the preliminary target object image.

The network server may determine, according to, for example, experience data, that the preliminary target object image belongs to various different categories, such as a landscape, a face, or an animal, so as to determine the preliminary categorization information of the preliminary target object image. For example, the network server may determine, according to the preliminary target object image shown in FIG. 5, that A belongs to a body (BODY), B belongs to a face (FACE), and a tower represented by C belongs to a landmark (LANDMARK).

408. The network server returns the preliminary categorization information to the AR client.

The foregoing manner is to identify, assisted by the network server, the preliminary categorization information to which the preliminary target object belongs. In specific implementation, the manner is not limited to this. For example, the preliminary categorization information may be determined by the AR client, and a determining manner may be the same as the network server, for example, based on the experience data.

409. The AR client presents the preliminary target object image to a user, and obtains a plurality of target objects selected by the user from the preliminary target object image.

The AT client presents the preliminary target object image to the user for the user to select; and the user may, by means of touchscreen click, keyboard input, speech input, and the like, select from the preliminary target object image the target object of which the user expects to obtain augmented information. For example, the user may select and obtain the target object with augmented information from three preliminary target objects A, B, and C shown in FIG. 5, for example, A and C may be selected.

410. The AR client presents the preliminary categorization information to the user, and receives the categorization information obtained upon correcting, by the user, the preliminary categorization information;

The AR client also presents the preliminary categorization information of the preliminary target object to the user. For example, "Catalog" shown on the right in FIG. 5 is the preliminary categorization information that includes: a preliminary categorization of A is a BODY, a preliminary categorization of B is a FACE, and a preliminary categorization of C is a LANDMARK. That the AR client presents the preliminary categorization information to the user is expecting that the user may determine that whether the categorization information is accurate and correct the categorization information if the categorization information is wrong. The user may, according to judgment of the user, perform correction by means of touchscreen click, keyboard input, and speech input. For example, when the preliminary categorization of C is a work of art, the user may correct the preliminary categorization into a landmark LANDMARK.

A reason for correcting the preliminary categorization information is that an image template is searched according to categorization information when requesting the image template subsequently. Therefore, the categorization information needs to be consistent with categorization on the network server side, otherwise it may affect subsequent searching and processing of the image template. Correspondingly, when the user corrects the preliminary categorization information, the user can know about categorization information that is consistent with the network server side, and the preliminary categorization can be corrected according to these accurate categorization information. A manner in which the user knows the foregoing accurate categorization information is not limited in this embodiment.

In addition, the AR client may also correct the preliminary categorization information. A correction manner may be, for example, by presetting information. For example, the AR client has preset that when a condition is satisfied, categorization information of an object belongs to category A, then the AR client may determine, according to the preset information, that the preliminary categorization information may be automatically corrected when the information is incorrect.

When accurate categorization information is obtained by correcting the preliminary categorization information, the categorization information of the preliminary target object is actually determined. When a target object selected from the preliminary target object by the user is obtained, correspondingly, categorization information of the target object is obtained; that is, through the foregoing step, the target object selected by the user, and the categorization information of the target object are obtained. In practical implementation, for example, preliminary categorization information of all preliminary target objects may first be obtained, then the preliminary categorization information corresponding to the target object is corrected after the target object is selected by the user; or the user first selects the target object from the preliminary target object, and then obtains the preliminary categorization information and the categorization information of the target object. In this embodiment, an execution sequence for acquiring the categorization information is not limited strictly. Just accurate categorization information of the target object is obtained before requesting acquiring of the image template.

For the target object, before requesting acquiring of the image template, an identification image of the target object needs to be obtained. The identification image has higher definition than the preliminary target object image, because the identification image is used to identify the target object during subsequent image identification. Therefore, there is a higher requirement for the definition of the identification image rather than to identify a preliminary outline individuality, as the preliminary target object is processed. In specific implementation, the identification image is usually a focused image of the target object. In respect of acquiring the focused image, manners of acquiring the focused image may be different when the terminal uses different cameras. For example, if the camera is a camera of a light field camera, step 411 is continued to be executed; if the camera is a camera of an ordinary camera, step 412 is continued to be executed.

411. The AR client focuses on the target object in the real image information to generate the identification image.

The light field camera uses a technology of taking a picture of light field information by using microlens, and refocusing on the different objects in the picture after taking the picture. For example, after shooting, two objects such as a man and a flower in the picture may be refocused. In this embodiment, if the real image information is obtained by using the light field camera in step 401, then in this step, different objects in the real image information obtained in step 401 may be focused separately; and specifically, each target object selected by the user from the real image information may be refocused to generate the identification image of the target object. For example, the user selects A and C shown in FIG. 5, then A and C in the real image information may be focused to obtain their respective identification image.

An advantage of shooting by using the light field camera is that identification images of a plurality of target objects may be obtained by shooting once rather than taking pictures for many times, which is convenient, simple, and efficient.

412. The AR client focuses on and shoots the target object by using an ordinary camera to obtain the identification image.

If the real image information is obtained by using the ordinary camera in step 401, then in this step, the plurality of target objects selected by the user needs to be focused on and shot by using the ordinary camera, so as to obtain a clear focused image of the target object, that is, an identification image by focusing and shooting the plurality of target objects separately.

413. The AR client sends an image template acquisition request to the network server, and carries categorization information of the target object.

414: The network server sends an image template corresponding to the categorization information that is sent by the terminal to the terminal.

The network server may send the image template corresponding to the categorization information to the terminal. For example, assuming that the categorization information sent by the terminal is "LANDMARK" shown in FIG. 5, the network server may send a plurality of image templates corresponding to the "LANDMARK" to the terminal.

415. The AR client sends the image template to the image identification unit to request the image identification.

The AR client may send the identification image of the target object obtained in step 411 or step 412, and the image template obtained in step 414 to the image identification unit, so as to request the image identification unit to perform image matching, that is, searching for which image template matches with the identification image.

416. The image identification unit performs the image identification.

The image identification unit compares the identification image with each image template. For example, if an image template is consistent with a size, a shape of the identification image, it indicates that the image template matches with the identification image, the target object is identified, and the target object is an object represented by the image template. For example, as described above, the image identification unit may discover, through the matching process, that one of the plurality of image templates under the "LANDMARK" matches with the identification image of the C tower (that is, a focused image of the tower) shown in FIG. 5, then identification of the target object C is complete.

The image identification unit returns an identification result to the AR client. For example, assuming that the image template on the network server side has a template identity and the template identity may be a name of the object represented by the template, such as a tower, a temple, and a theater. Many image templates are provided under the foregoing categorization information "LANDMARK", assuming that the image templates include the image templates of the tower, the temple, and the theater. A target object on the terminal side is C, that is, the tower shown in FIG. 5. The image identification unit matches an identification image of the tower with each image template and identifies them, and finally finds that the image template of the tower matches with the identification image of the target object C, then in this case, the template identity for the image template of the tower, that is, the tower, may be fed back to the AR client, by the image identification unit, and the AR client may know that the target object C is the tower.

417. The image identification unit returns the identification result to the AR client.

418. The AR client sends the image template acquisition request to the network server, and carries the target object identifier.

As described above, the target object identifier may be, for example, the tower.

419. The network server sends the augmented information corresponding to the target object to the AR client.

The network server searches for the augmented information corresponding to the "tower" according to the target object identifier "tower" sent by the terminal, where the augmented information is information related to the target object, tower, such as a height and construction time of the tower. On the network server side, the image template, the template identity, and the augmented information may correspond to each other. For example, the image template of the tower, the identity "tower", and the augmented information of the tower are stored correspondingly. On the terminal side, during an identification process of the image matching of the identification image of the target object and the image template of the tower, it is finally identified that the target object is an object represented by the image template of the tower, that is, the "tower", and the identity "tower" used as the target object identifier, is sent to the network server for requesting the corresponding augmented information.

It should be noted that in this embodiment, the user may select the plurality of target objects all at once from a piece of real image information. During the steps of acquiring the categorization of each target object, requesting the image template and the augmented information of each target object, a manner of requesting simultaneously may be used. For example, the identity of each target object is sent to the network server, and the network server sends the augmented information of each target object to the AR client simultaneously. Or a manner of requesting separately may be used, that is, each target object is processed separately. In this embodiment, even each target object is processed separately, because selection of the plurality of target objects, made by the user, is obtained quickly, processing of the subsequent categorization and augmented information may also be quick. Compared with the manner of processing the target object one by one by acquiring and categorizing first and then shooting in the prior art, the manner provided in this embodiment significantly improves a processing efficiency of the augmented reality.

In addition, the method provided in this embodiment has the following advantages: in the prior art, a category of the target object that needs the augmented information is first selected, and then a picture is taken and the image identification is performed on the target object. Therefore, when implementing the AR, the user first needs to determine what the target object that is wanted to select is, then the category may be selected. If the user takes a picture of a current scenario randomly, then subsequent processing steps may not be performed because the category is not preselected by the user. Therefore, it is not convenient to use the manner of implementing augmented reality in the prior art; in addition, the method is complicated. However, the manner provided in this embodiment allows the user to shoot randomly, and perform the processing of selecting and categorizing the target object in the subsequent steps, which provides more convenience for the user. In addition, the manner also can obtain the selection of the plurality of target objects made by the user quickly, and obtain the categorization and augmented information of the plurality of target objects quickly, which is of high efficiency.

420. The AR client simultaneously displays the identification image of the target object and the augmented information to form the augmented reality.

The AR client superimposes the identification image of the target object with the augmented information to form user experience of the augmented reality.

According to a method for implementing augmented reality provided in this embodiment, identification of a plurality of targets is performed by using a hierarchical manner, that is, a preliminary target object and preliminary categorization information are first obtained. After the preliminary target object is obtained, the user selects a target object and obtains a focused image of the target object, which reduces processing steps, so that an identification image of the target object is only obtained to avoid resources waste of processing a non-target object. In addition, accurate categorization information is obtained by correcting the preliminary categorization information, which may improve identification accuracy of the categorization information of the target object, so as to better ensure high-speed and accuracy of acquiring an image template according to the categorization information.

Embodiment 4

Figure 6:
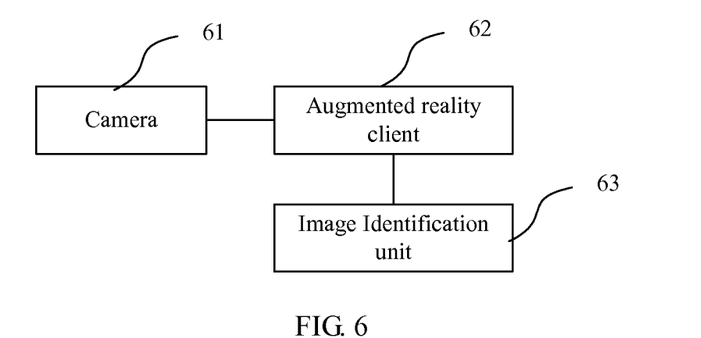
FIG. 6 is a schematic structural diagram of a terminal according to an embodiment of the present invention.

FIG. 6 is a schematic structural diagram of a terminal according to an embodiment of the present invention. The terminal may execute a method for implementing augmented reality provided in any embodiment of the present invention. This embodiment only briefly describes a structure of the terminal, and for a specific working principle of the terminal, reference may be made to the description of the method embodiment.

As shown in FIG. 6, the terminal provided in the embodiment may include: a camera 61, an augmented reality client 62, and an image identification unit 63.

The camera 61 is configured to obtain real image information.

The augmented reality client 62 is configured to: obtain the real image information obtained by the camera, obtain one or more target objects selected by a user from the real image information; and with respect to each target object, obtain an identification image that is used to identify the target object and categorization information of the target object; obtain an image template corresponding to the categorization information from a network server; and obtain augmented information corresponding to each identified target object from the network server, and simultaneously display the identification image of the target object and the augmented information to form augmented reality.

The image identification unit 63 is configured to match the image template obtained by the augmented reality client 62 with the identification image to identify each target object.

Further, the image identification unit 63 is further configured to receive the real image information sent by the augmented reality client, and perform preliminary identification of the real image information to obtain a preliminary target object image, where definition of the preliminary target object image is lower than definition of the identification image of the target object; and return the preliminary target object image to the augmented reality client; and the augmented reality client 62 is further configured to present the preliminary target object image identified by the image identification unit to the user, and obtain one or more target objects selected by the user from the preliminary target object image.

Further, the augmented reality client 62 is further configured to obtain preliminary categorization information of the target object, and the categorization information obtained upon correcting the preliminary categorization information.

Further, the augmented reality client 62 is specifically configured to: send the preliminary target object image to the network server, and receive the preliminary categorization information that is returned by the network server and is corresponding to the preliminary target object image; or locally determine preliminary categorization information corresponding to the preliminary target object image.

Further, the augmented reality client 62 is specifically configured to present the preliminary categorization information to the user, and receive categorization information obtained upon correcting, by the user, the preliminary categorization information; or obtain the categorization information upon locally correcting the preliminary categorization information.

Further, if the camera is a camera of an ordinary camera, the augmented reality client 62 is further configured to obtain the identification image obtained by focusing on and shooting the target object by using the camera; and if the camera is a camera of a light field camera, the augmented reality client 62 is further configured to generate the identification image by focusing on the target object in the real image information.

Embodiment 5

Figure 7:
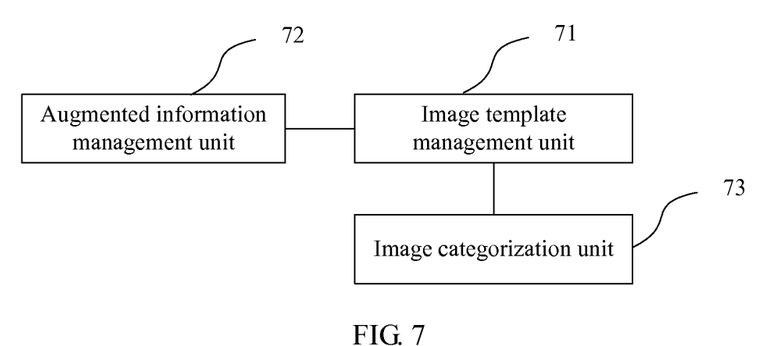
FIG. 7 is a schematic structural diagram of a network server according to an embodiment of the present invention.

FIG. 7 is a schematic structural diagram of a network server according to an embodiment of the present invention. The network server may execute a method for implementing augmented reality provided in any embodiment of the present invention. This embodiment only briefly describes a structure of the network server, and for a specific working principle of the network server, reference may be made to the description of the method embodiment.

As shown in FIG. 7, the network server provided in the embodiment may include: an image template management unit 71 and an augmented information management unit 72, where:

the image template management unit 71 is configured to send, to a terminal, an image template corresponding to categorization information that is sent by the terminal, so that the terminal identifies a target object by performing image matching according to the image template and an identification image of a target object corresponding to the categorization information; where the target object is one or more target objects selected by a user from a real image information obtained from the terminal by using a camera, and the categorization information is categorization information of each target object; and the augmented information management unit 72 is configured to separately send, to the terminal, augmented information corresponding to each target object that is identified by the terminal, so that the terminal simultaneously displays the augmented information and the identification image of the target object to form augmented reality.

Further, the network server may include: an image categorization unit 73 that is configured to receive a preliminary target object image sent by the terminal, where the preliminary target object image is obtained by performing, by the terminal, preliminary identification of the real image information, and the target object is obtained by selecting from the preliminary target object image; and definition of the preliminary target object image is lower than definition of the identification image of the target object; and send, to the terminal, preliminary categorization information corresponding to the preliminary target object image, so that the terminal obtains the categorization information obtained upon correcting the preliminary categorization information.

Persons of ordinary skill in the art may understand that all or a part of the steps of the method embodiments may be implemented by a program instructing relevant hardware. The program may be stored in a computer readable storage medium. When the program runs, the steps of the method embodiments are performed. The foregoing storage medium includes: any medium that can store program code, such as a ROM, a RAM, a magnetic disk, or an optical disc.

Finally, it should be noted that the foregoing embodiments are merely intended for describing the technical solutions of the present invention other than limiting the present invention. Although the present invention is described in detail with reference to the foregoing embodiments, persons of ordinary skill in the art should understand that they may still make modifications to the technical solutions described in the foregoing embodiments or make equivalent replacements to some or all technical features thereof, without departing from the scope of the technical solutions of the embodiments of the present invention.

What is claimed is:

1. A method for implementing augmented reality, comprising:
    acquiring real image information by using a camera;
    acquiring one or more target objects selected by a user from the real image information;
    with respect to each target object, acquiring an identification image that is used to identify the target object, and categorization information of the target object separately;
    acquiring an image template corresponding to the categorization information, and performing image matching of the image template with the identification image to identify each target object; and
    acquiring augmented information corresponding to each identified target object separately by using a correspondence between the augmented information and the image template matched to the identification image which identifies the target object, and simultaneously displaying the identification image of the target object and the augmented information to form the augmented reality.

2. The method for implementing augmented reality according to claim 1, wherein the acquiring one or more target objects selected by a user from the real image information comprises:
    performing preliminary identification of the real image information to obtain a preliminary target object image, wherein definition of the preliminary target object image is lower than definition of the identification image of the target object; and
    acquiring one or more target objects selected by the user from the preliminary target object image.

3. The method for implementing augmented reality according to claim 1, wherein the acquiring categorization information of the target object comprises:
acquiring preliminary categorization information of the target object; and
acquiring the categorization information obtained upon correcting the preliminary categorization information.

4. The method for implementing augmented reality according to claim 3, wherein when the preliminary target object image is obtained by performing the preliminary identification of the real image information, and the one or more target objects are obtained by selecting from the preliminary target object image,
the acquiring preliminary categorization information of the target object comprises:
sending the preliminary target object image to a network server, and receiving preliminary categorization information that is returned by the network server and is corresponding to the preliminary target object image;
or, locally determining preliminary categorization information corresponding to the preliminary target object image.

5. The method for implementing augmented reality according to claim 3, wherein the acquiring the categorization information obtained upon correcting the preliminary categorization information comprises:
presenting the preliminary categorization information to the user, and receiving the categorization information obtained by the user upon correcting the preliminary categorization information;
or, obtaining the categorization information upon locally correcting the preliminary categorization information.

6. The method for implementing augmented reality according to claim 1, wherein:
if the camera is a camera of an ordinary camera, the acquiring an identification image that is used to identify the target object comprises: acquiring the identification image by focusing on and shooting the target object by using the ordinary camera; and
if the camera is a camera of a light field camera, the acquiring an identification image that is used to identify the target object comprises: generating the identification image by focusing on the target object in the real image information.

7. A method for implementing augmented reality, comprising:
sending, to a terminal, an image template corresponding to categorization information that is sent by the terminal, so that the terminal identifies a target object by performing image matching according to the image template and an identification image of a target object corresponding to the categorization information; wherein the target object is one or more target objects selected by a user from real image information obtained from the terminal by using a camera, and the categorization information is categorization information of each target object; and
sending, to the terminal, augmented information corresponding to each target object that is identified by the terminal, the augmented information being obtained by using a correspondence between the augmented information and the image template matched to the identification image which identifies the target object, so that the terminal simultaneously displays the augmented information and the identification image of the target object to form the augmented reality.

8. The method for implementing augmented reality according to claim 7, wherein before the sending, to a terminal, an image template corresponding to categorization information that is sent by the terminal, the method further comprises:
receiving a preliminary target object image sent by the terminal, wherein the preliminary target object image is obtained, by the terminal, by performing preliminary identification of the real image information, and the target object is obtained by selecting from the preliminary target object image; and definition of the preliminary target object image is lower than definition of the identification image of the target object; and
sending, to the terminal, preliminary categorization information corresponding to the preliminary target object image, so that the terminal obtains the categorization information obtained upon correcting the preliminary categorization information.

9. A terminal, comprising:
a camera, configured to obtain real image information;
an augmented reality client, configured to: obtain the real image information obtained by the camera, obtain one or more target objects selected by a user from the real image information; and with respect to each target object, obtain an identification image that is used to identify the target object and categorization information of the target object separately; obtain an image template corresponding to the categorization information; and obtain augmented information corresponding to each identified target object separately, and simultaneously display the identification image of the target object and the augmented information to form augmented reality; and
an image identification unit, configured to perform image matching of the image template obtained by the augmented reality client with the identification image to identify each target object,
wherein the augmented information is obtained by using a correspondence between the augmented information and the image template matched to the identification image which identifies the target object.

10. The terminal according to claim 9, wherein:
the image identification unit is further configured to receive the real image information sent by the augmented reality client, and perform preliminary identification of the real image information to obtain a preliminary target object image, wherein definition of the preliminary target object image is lower than definition of the identification image of the target object; and return the preliminary target object image to the augmented reality client; and
the augmented reality client is further configured to present the preliminary target object image identified by the image identification unit to the user, and obtain one or more target objects selected by the user from the preliminary target object image.

11. The terminal according to claim 9, wherein:
the augmented reality client is further configured to obtain preliminary categorization information of the target object, and the categorization information obtained upon correcting the preliminary categorization information.

12. The terminal according to claim 11, wherein:
the augmented reality client is configured to: send the preliminary target object image to a network server, and receive preliminary categorization information that is returned by the network server and is corresponding to the preliminary target object image; or locally determine preliminary categorization information corresponding to the preliminary target object image.

13. The terminal according to claim 11, wherein:
the augmented reality client is configured to: present the preliminary categorization information to the user, and receive the categorization information obtained by the user upon correcting, the preliminary categorization information; or obtain the categorization information upon locally correcting the preliminary categorization information.

14. The terminal according to claim 9, wherein:
if the camera is a camera of an ordinary camera, the augmented reality client is further configured to obtain the identification image obtained by focusing on and shooting the target object by using the camera; and
if the camera is a camera of a light field camera, the augmented reality client is further configured to generate the identification image by focusing on the target object in the real image information.

15. A network server, comprising:
an image template management unit, configured to send, to a terminal, an image template corresponding to categorization information that is sent by the terminal, so that the terminal identifies the target object by performing image matching according to the image template and an identification image of the target object corresponding to the categorization information; wherein the target object is one or more target objects selected by a user from real image information obtained from the terminal by using a camera, and the categorization information is categorization information of each target object; and
an augmented information management unit, configured to send, to the terminal, augmented information that is corresponding to each target object and is identified by the terminal, the augmented information being obtained by using a correspondence between the augmented information and the image template matched to the identification image which identifies the target object, so that the terminal simultaneously displays the augmented information and the identification image of the target object to form augmented reality.

16. The network server according to claim 15, further comprising:
an image categorization unit, configured to: receive a preliminary target object image sent by the terminal, wherein the preliminary target object image is obtained by performing preliminary identification of the real image information by the terminal, and the target object is obtained by selecting from the preliminary target object image; and definition of the preliminary target object image is lower than definition of the identification image of the target object; and send, to the terminal, preliminary categorization information corresponding to the preliminary target object image, so that the terminal obtains the categorization information obtained upon correcting the preliminary categorization information.

\* \* \* \* \*